July 27, 1943.　　　　N. J. ALLBRIGHT　　　　2,325,213
SMOKEHOUSE
Filed Jan. 30, 1941　　　　6 Sheets-Sheet 3
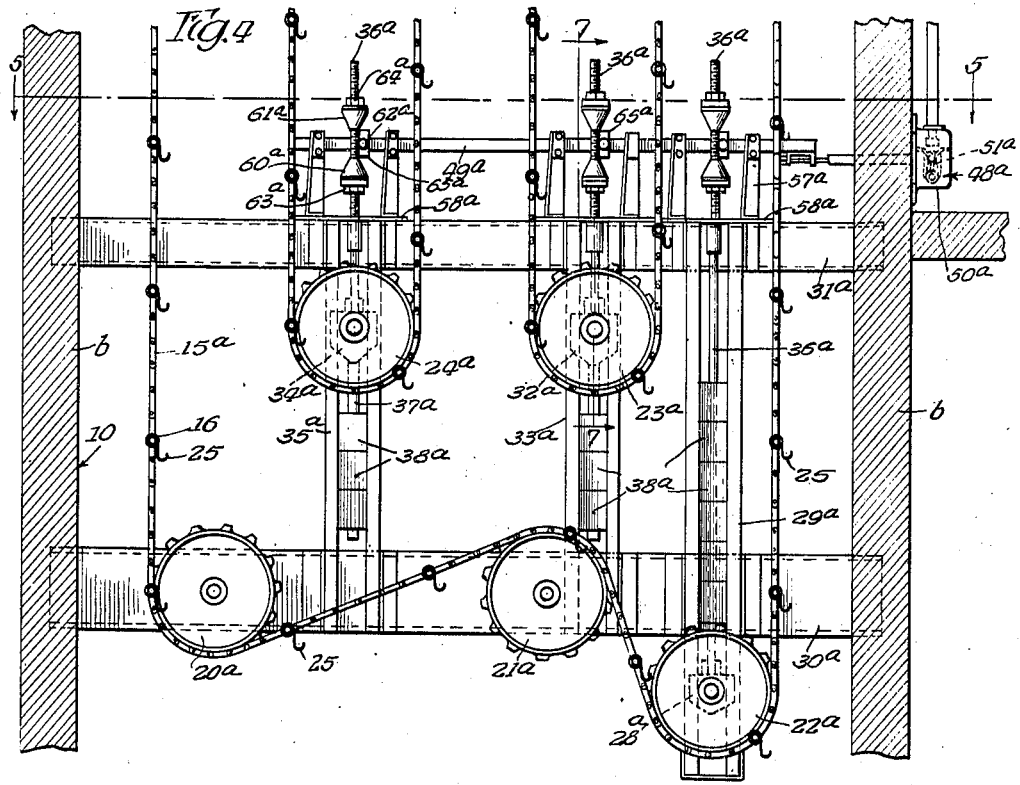
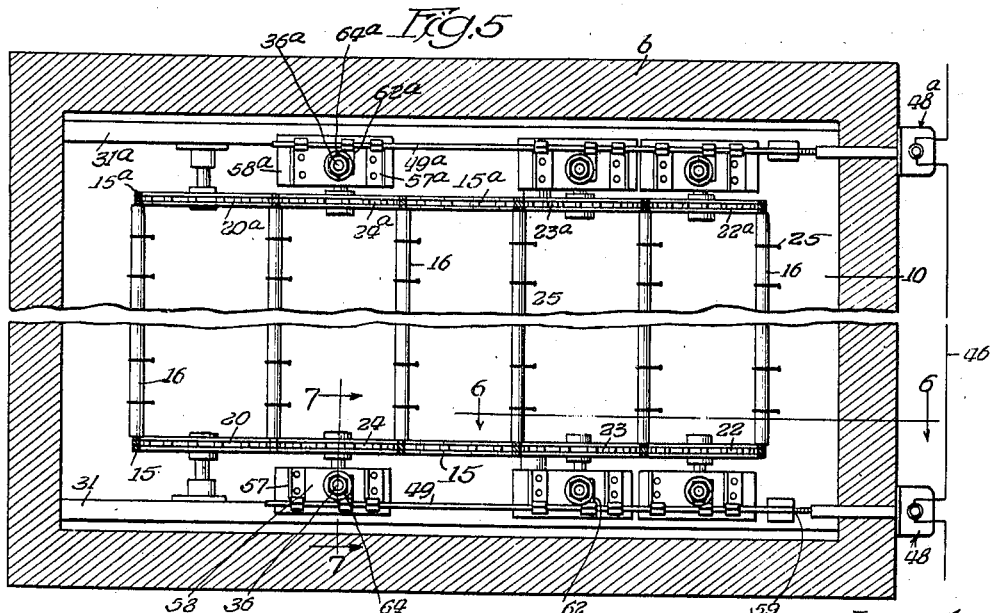
Inventor
Norman J. Allbright
By Fred Gerlach Atty

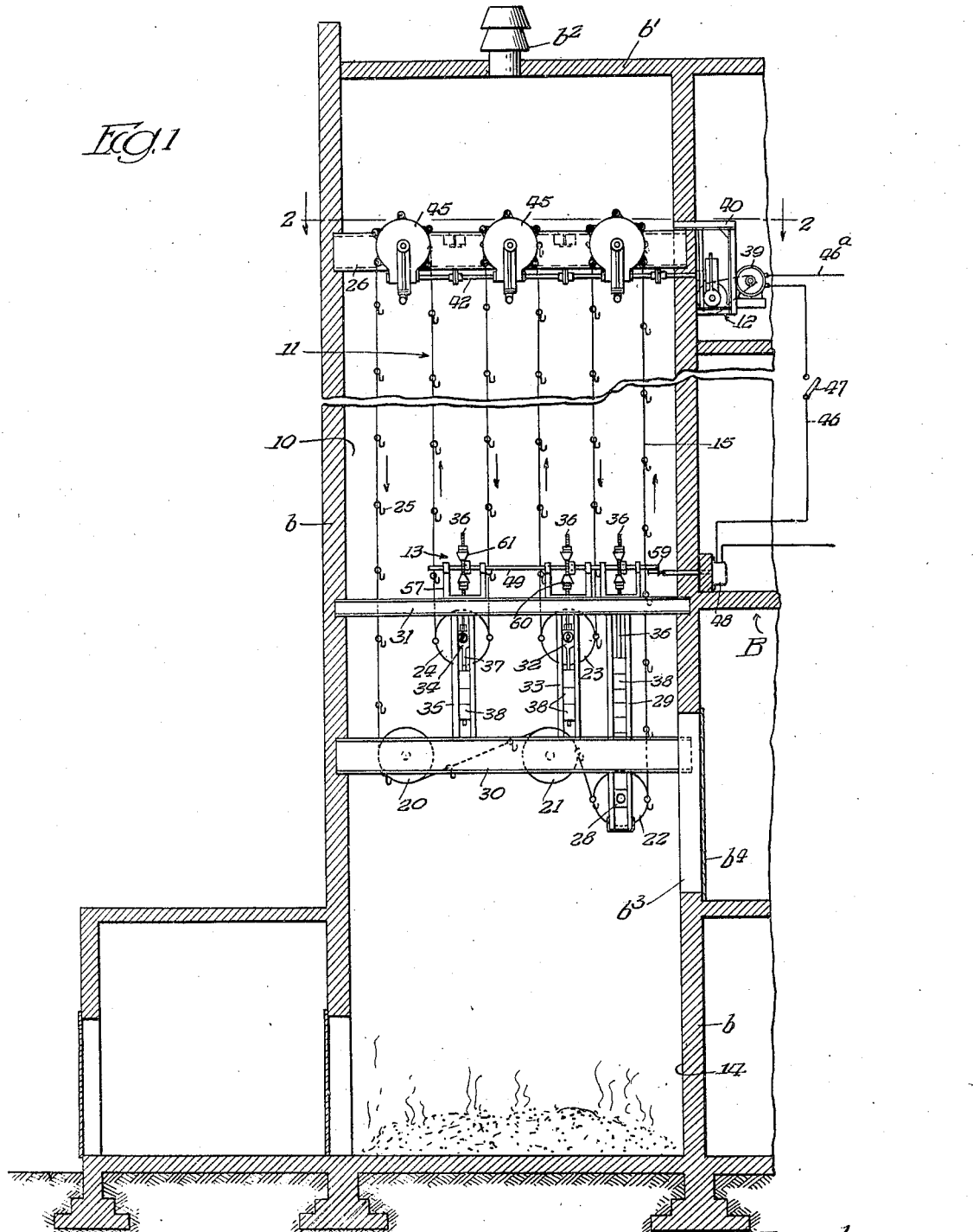

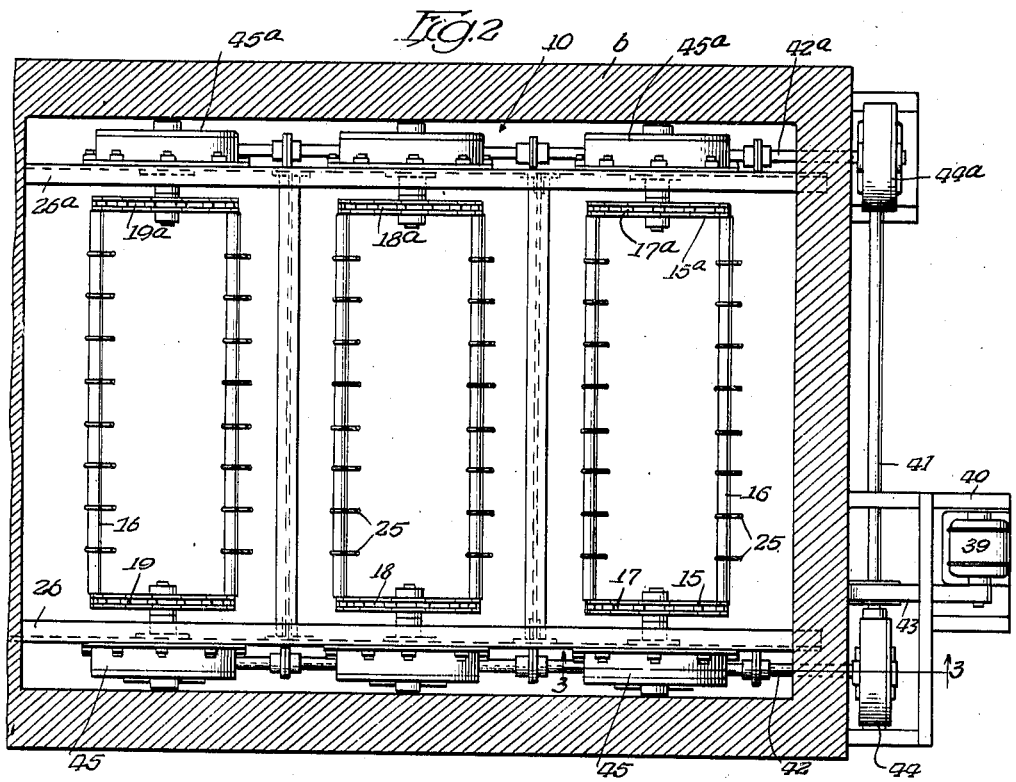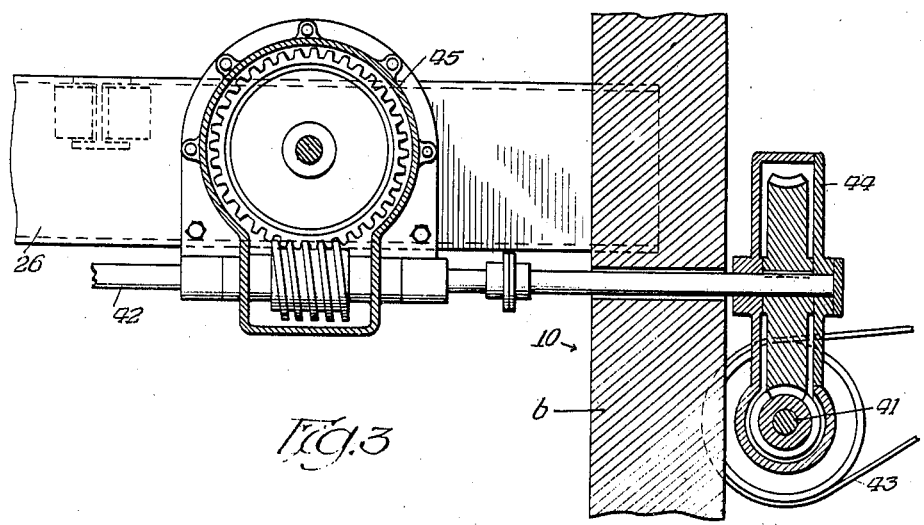

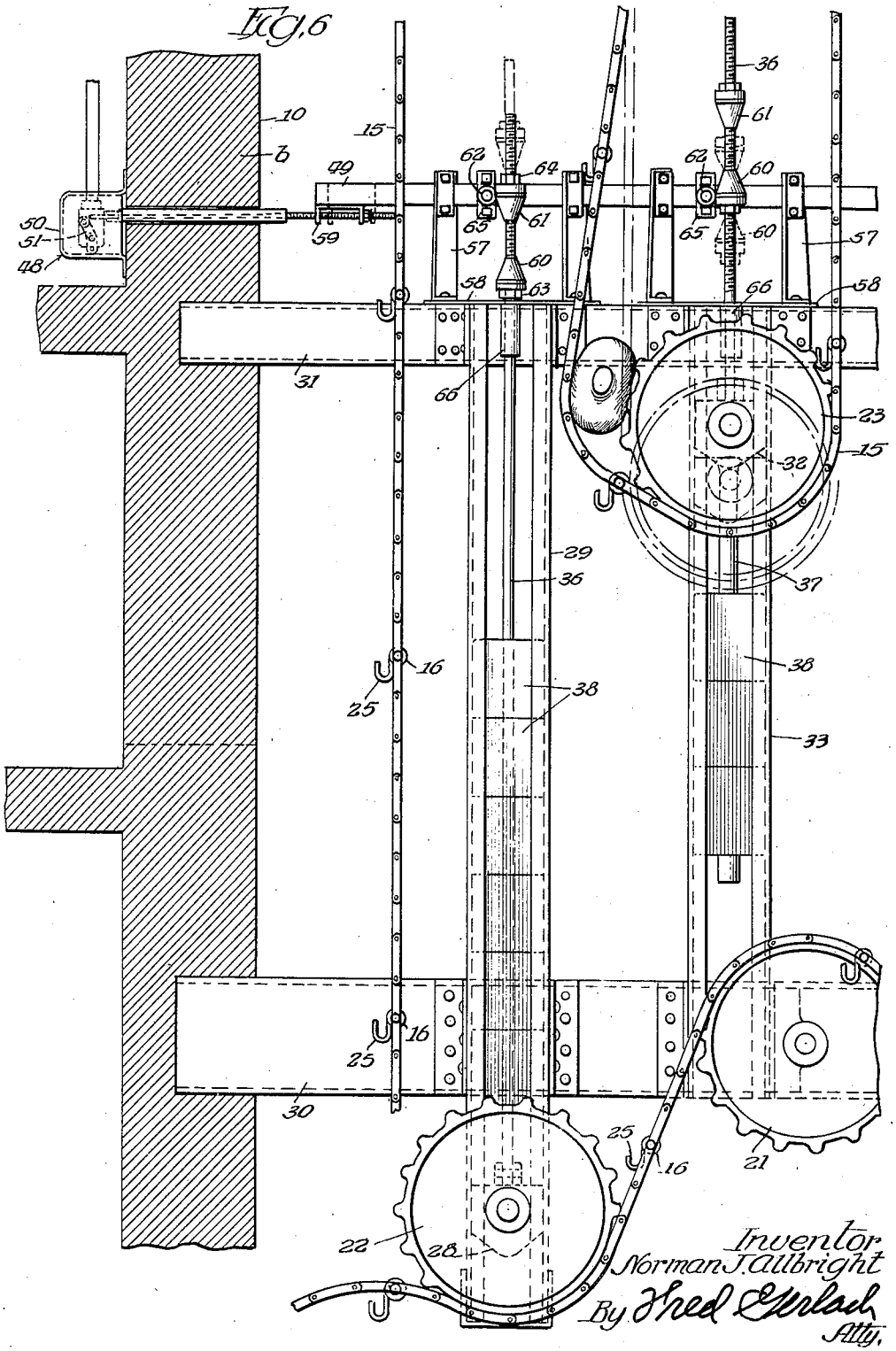

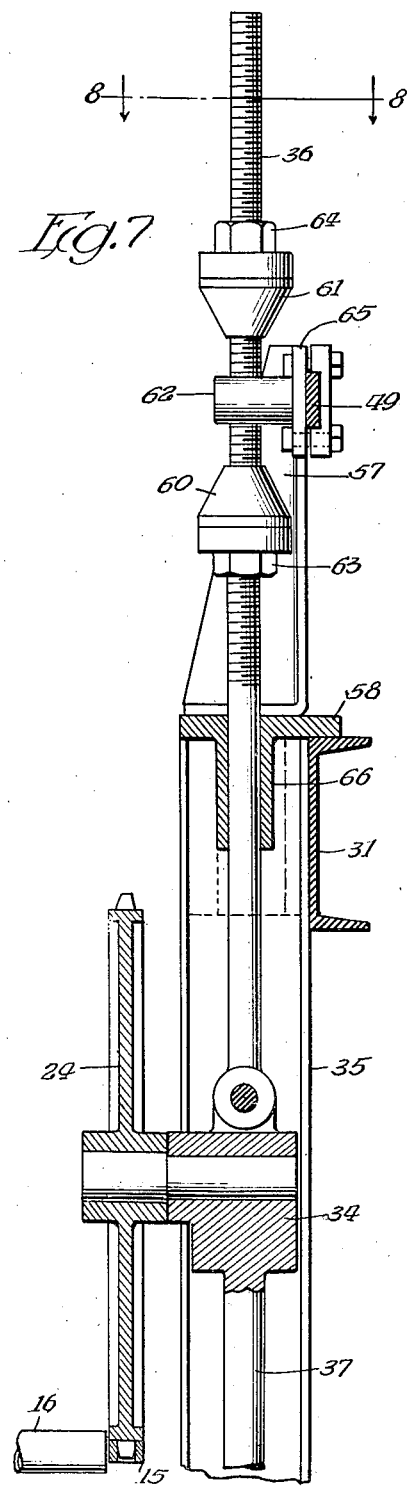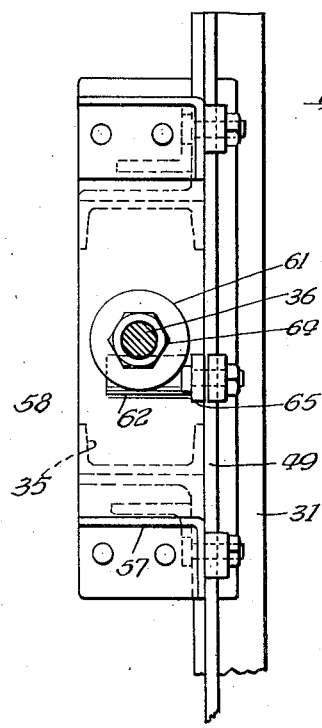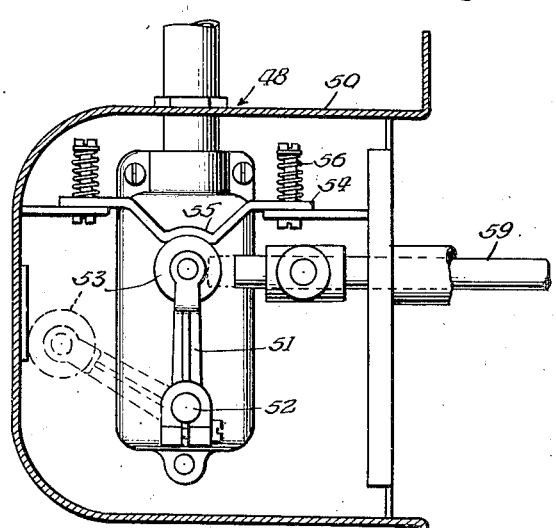

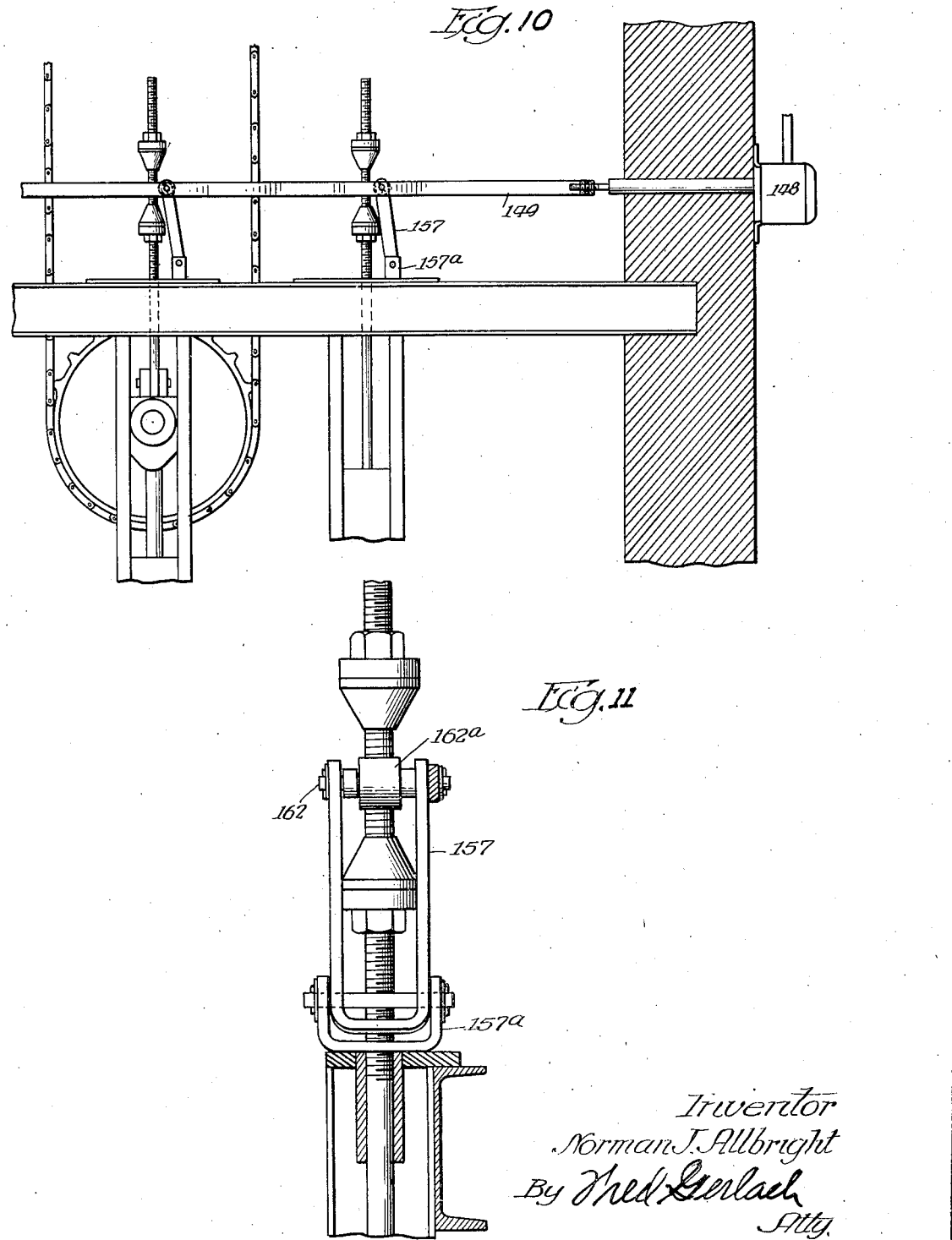

Patented July 27, 1943

2,325,213

UNITED STATES PATENT OFFICE 2,325,213

SMOKEHOUSE

Norman J. Allbright, Hinsdale, Ill., assignor to The Allbright-Nell Co., Chicago, Ill., a corporation of Illinois Application January 30, 1941, Serial No. 376,571

10 Claims. (Cl. 99—261)

The present invention relates generally to smokehouses for conditioning and smoking hams, bacon, sausage, fish, poultry, and like products. More particularly the invention relates to that type of smokehouse and as its main or principal parts comprises—(1) a building-formed smoke chamber having means for generating or producing smoke therein; (2) an endless conveyor which is disposed in the smoke chamber and embodies a pair of similar laterally spaced endless chains together with crossbars between the chains for supporting the meat products to be conditioned and smoked, and also embodies a plurality of drive sprocket wheels, idler sprocket wheels and take-up sprocket wheels for supporting the chains in such manner that the conveyor has a plurality of parallel reaches; and (3) power mechanism which serves slowly and continuously to drive the conveyor during operation of the smokehouse and is in the form of an electric motor and gearing between the motor and the drive sprocket wheels.

In the operation or use of a smokehouse of this type the chains of the endless conveyor sometimes break or run off the sprocket wheels. This generally occurs when any one of the meat products on the crossbars falls between one of the chains and a sprocket wheel. Should one or both of the chains break or run off the sprocket wheels the conveyor as a general rule drops to the bottom of the smoke chamber. In such instance the meat products are generally damaged to such an extent that they are not edible or usable.

The primary object of the present invention is to provide a smokehouse having means whereby the power mechanism for driving the endless conveyor is automatically stopped or rendered inoperative when either of the chains breaks or runs off any of its sprocket wheels for any reason whatsoever. By providing automatic control means of this character there is no likelihood whatsoever of the entire conveyor falling to the bottom of the smoke chamber and hence the possibility of injury or damage to the products as well as the operating parts of the smokehouse is effectively avoided.

Another object of the invention is to provide a smokehouse of the type and character under consideration in which the automatic control means for stopping or rendering inoperative the conveyor driving mechanism comprises a pair of normally closed switches in the electrical circuit for the motor of the conveyor driving mechanism and also comprises a pair of bars which are associated with the chains and switches, respectively, and are adapted in the event of displacement of the take-up sprocket wheels due to wedging of meat products between them and the chains or breaking or dislodgement of the chains, to be moved in such manner as to open the switches and thus interrupt the flow of current to the motor.

A further object of the invention is to provide a smokehouse which is generally an improvement upon, and has certain advantages over, previously designed smokehouses of the same general character.

Other objects of the invention and the various advantages and characteristics of the present smokehouse will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views:

Figure 1 is a vertical section of a smokehouse embodying one form of the invention;

Figure 2 is an enlarged horizontal section taken on the line 2—2 of Figure 1 and illustrating in detail the construction and arrangement of the power mechanism for driving the endless conveyor;

Figure 3 is an enlarged vertical section taken on the line 3—3 of Figure 2 and showing the construction of a portion or part of the gearing between the electric motor and the drive sprocket wheels;

Figure 4 is an enlarged vertical longitudinal section of the lower portion of the endless conveyor illustrating in detail the arrangement of certain of the idler and take-up sprocket wheels;

Figure 5 is a horizontal section taken on the line 5—5 of Figure 4;

Figure 6 is an enlarged vertical section taken on the line 6—6 of Figure 5 and showing the manner in which the switches of the automatic control means for the conveyor driving mechanism are shifted into their open positions in the event of breakage of the conveyor chains or wedging or jamming of the products to be conditioned and smoked between the chains and take-up sprocket wheels;

Figure 7 is an enlarged section taken on the line 7—7 of Figure 5 and illustrating the construction, design and arrangement of the means for shifting the bars of the automatic control means into their switch opening position in the event of displacement of the take-up sprocket wheels;

Figure 8 is a section on the line 8—8 of Figure 7;

Figure 9 is a section of one of the switches of the control means;

Figure 10 is a fragmentary vertical section illustrating a different form of switch controlling means, and Figure 11 is an enlarged section on the line 11—11 of Figure 10.

The smokehouse which is shown in Figures 1 to 9, inclusive, constitutes one form or embodiment of the invention. It is expressly designed for use in conditioning and smoking hams, bacon, sausage, fish, poultry, and other meat products and comprises a smoke chamber 10, an endless conveyor 11, power mechanism 12 for driving the conveyor, and automatic control means 13 for the power mechanism.

The smoke chamber 10 is vertically elongated and is illustrated in Figure 1 as forming a part of a packing plant building B. It houses the endless conveyor 11 and is formed or defined by a plurality of vertically extending walls b. The bottom of the smoke chamber constitutes a smoke generating or producing compartment 14. It is contemplated in connection with use of the smokehouse that this compartment be filled with wood and sawdust. When such material is burned the smoke which is produced by the smoldering mass passes or flows upwards through the smoke chamber 10 and effects the desired conditioning or smoking of the meat products within the chamber. As an alternative smoke may be produced on the outside of the compartment 14 and delivered into the smoke chamber by a fan or blower. The top of the smoke chamber 10 is closed by a top wall b¹ and this has a valve controlled exhaust stack b² for permitting in a controlled manner the exhaust of smoke from the chamber. Access is had to the smoke chamber by way of a doorway b³ in one of the walls b of the building B. This doorway is normally closed by a door b⁴ as shown in Figure 1. When the door is in its open position the meat products to be processed or treated may be placed on the conveyor and the products after processing or smoke treating may be removed from the smoke chamber 10.

The endless conveyor 11 is adapted to carry the meat products during processing or smoke treatment thereof in the smoke chamber 10 and comprises a pair of similar laterally spaced endless chains 15 and 15ª and a plurality or series of crossbars 16 between the chains. In addition the conveyor comprises a pair of opposed drive sprocket wheels 17 and 17ª, a pair of opposed drive sprocket wheels 18 and 18ª, a pair of opposed drive sprocket wheels 19 and 19ª, a pair of opposed idler sprocket wheels 20 and 20ª, a pair of opposed idler sprocket wheels 21 and 21ª, a pair of opposed take-up sprocket wheels 22 and 22ª, a pair of opposed take-up sprocket wheels 23 and 23ª and a pair of opposed take-up sprocket wheels 24 and 24ª. The crossbars 16 extend horizontally and have the ends thereof suitably secured to the two chains 15 and 15ª. They are preferably spaced equidistantly apart and have notches at regular intervals throughout their length. The meat products to be processed are supported from the crossbars 16 by way of hooks 25 and these fit within the notches in the crossbars. The drive sprocket wheels are disposed in a horizontal plane in the upper portion of the smoke chamber 10. The drive sprocket wheels 17, 18 and 19 are in horizontal alignment and are provided with stub axles which are journalled in bearings on a horizontally extending channel beam 26. The latter is disposed outwards or to one side of the chain 15 of the conveyor and is suitably supported at the upper end of the smoke chamber 10. The drive sprocket wheels 17ª, 18ª and 19ª are also disposed or positioned in horizontal alignment. They are provided with stub axles and these are journalled in bearings on a horizontally extending channel beam 26ª which is disposed outwards of the chain 15ª and is carried by certain of the walls b so that it is in laterally spaced relation with the beam 26. The take-up sprocket wheel 22 is disposed in the bottom portion of the smoke chamber 10 and is vertically aligned with the drive sprocket wheel 17. It embodies a stub axle and is mounted for vertical sliding movement by way of a bearing block 28 and a pair of opposed vertically extending laterally spaced channel beams 29. The lower ends of the beams 29 are welded or otherwise fixedly secured to the web of a horizontally extending channel beam 30 and the upper ends of such beams are secured to the web of a horizontally extending channel beam 31. The bearing block 28 is slidably mounted between the vertically extending beams 29 with the result that the take-up sprocket wheel 22 is free to move vertically. The beam 30 is disposed a slight distance above the lower ends of the beam 29. It is carried by certain of the walls b and is located outwards of the chain 15. The horizontally extending beam 31 is disposed above and vertically aligned with the beam 30 and is carried by the same walls as the latter. The take-up sprocket wheel 22a is positioned in opposed relation with the sprocket wheel 22 and is provided with a central stub axle. The latter is journalled in a bearing block 28ª which is mounted for vertically sliding movement between a pair of vertically extending laterally spaced channel beams 29ª. The latter are disposed in parallel relation with the beams 29 and have their lower ends connected to a horizontally extending channel beam 30ª and their upper ends secured to a horizontally extending channel beam 31ª. The beams 30ª and 31ª are positioned opposite to, and in parallel relation with, the beams 30 and 31, respectively. They are suitably carried by certain of the walls b and are located outwards of the chain 15ª. The take-up sprocket wheel 23 is disposed beneath and between the drive sprocket wheels 17 and 18 and is provided with a stub axle which is journalled in a bearing block 32. The latter is mounted for vertical sliding movement between a pair of vertically extending laterally spaced channel beams 33, the lower ends of which are fixed to the beam 30 and the upper ends of which are fixed or secured to the beam 31. The take-up sprocket wheel 23ª is disposed in opposed relation with the sprocket wheel 23 and is located in the same vertical plane as the drive sprocket wheels 17ª, 18ª and 19ª. It embodies a centrally disposed stub axle and is mounted for vertical sliding movement by way of a bearing block 32ª which serves as a journal for the stub axle of the take-up sprocket wheel 23ª and is slidably mounted between a pair of vertically extending laterally spaced channel bars 32ª. The latter are horizontally aligned and in parallel relation with the vertically extending channel beams 33 and have the lower ends thereof fixed to the horizontally extending channel beam 30ᵃ and their upper ends secured to the horizontally extending channel beam 31ᵃ. The take-up sprocket wheel 24 is horizontally aligned with the sprocket wheel 23 and is disposed beneath and between the drive sprocket wheels 18 and 19. It embodies a centrally disposed stub axle and is mounted for vertical sliding movement by way of a bearing block 34 which serves as a journal for the stub axle of the take-up sprocket wheel 24 and is slidable vertically between a pair of vertically extending laterally spaced channel beams 35. The latter are horizontally aligned with the channel beams 33 and have the lower ends thereof suitably secured to the channel beam 30 and their upper ends fixed or secured to the channel beam 31. The take-up sprocket wheel 24ᵃ is disposed directly opposite the take-up sprocket wheel 24 and is positioned beneath and between the drive sprocket wheels 18ᵃ and 19ᵃ. It embodies a stub axle and is mounted for vertical sliding movement by way of a bearing block 34ᵃ which is slidable vertically between a pair of vertically extending laterally spaced channel beams 35ᵃ. The latter are horizontally aligned with the channel beams 33ᵃ and have the lower ends thereof secured to the channel beam 30ᵃ and the upper ends secured to the channel beam 31ᵃ. The idler sprocket wheels 20 and 20ᵃ are located at the bottom of the smoke chamber 10 and are disposed beneath and vertically aligned with the drive sprocket wheels 19 and 19ᵃ, respectively. They have individual or separate stub axles and are carried by bearings on the channel beams 30 and 30ᵃ. The idler sprocket wheels 21 and 21ᵃ are located adjacent the take-up sprocket wheels 23 and 23ᵃ, respectively. They are disposed between the idler sprocket wheels 20 and 20ᵃ and the take-up sprocket wheels 22 and 22ᵃ and have stub axles which are journalled in bearings on the central portions of the beams 30 and 30ᵃ. The chain 15 of the endless conveyor 11 is trained around the sprocket wheels 17, 18, 19, 20, 21, 22, 23 and 24 in such manner that it extends around and then upwards from the take-up sprocket wheel 22, then around the drive sprocket wheel 17, then downwards and around the take-up sprocket wheel 23, then upwards and around the drive sprocket wheel 18, then downwards and around the take-up sprocket wheel 24, then upwards and around the drive sprocket wheel 19, then downwards and around the idler sprocket wheel 20 and then over and around the idler sprocket wheel 21. The other chain of the conveyor, that is, chain 15ᵃ is similarly trained around the sprocket wheels 17ᵃ, 18ᵃ, 19ᵃ, 20ᵃ, 21ᵃ, 22ᵃ, 23ᵃ and 24ᵃ. The bearing blocks 28, 32 and 34 which are associated respectively with the take-up sprocket wheels 22, 23 and 24 are provided with upwardly extending rods 36, as shown in Figure 1, and these rods project above the horizontally extending channel beam 31 and have external screw threads. The bearing blocks 32 and 34 have depending rods 37 in addition to the upwardly extending rods 36. The sprocket wheels 22, 23 and 24 are weighted in order to maintain the chain 15 of the endless conveyor taut at all times by way of weights 38. The weights for the take-up sprocket wheel 22 are mounted for vertical sliding movement between the lateral channel beams 29 and are mounted on the rod 36 which extend upwardly from the bearing block 28. The weights for the take-up sprocket wheel 23 are vertically slidable between the channel beams 33 and are mounted on the rod 37 which depends from the bearing block 32. The weights for the take-up sprocket wheels 24 are vertically slidable between the vertically spaced channel beams 35 and are mounted on the rod 37 which depends from the bearing block 34. The bearing blocks 28ᵃ, 32ᵃ and 34ᵃ which are associated respectively with the take-up sprocket wheels 22ᵃ, 23ᵃ and 24ᵃ are provided with vertically extending rods 36ᵃ. These rods correspond to and are positioned in opposed relation with the rods 36 and have the upper ends thereof externally threaded and projecting above the horizontally extending channel beam 31ᵃ. The bearing blocks 32ᵃ and 34ᵃ embody depending rods 37ᵃ in addition to the upwardly extending rods 36ᵃ. Weights 38ᵃ urge the take-up sprocket wheels 22ᵃ, 23ᵃ and 24ᵃ downwards and thus serve to maintain in a taut condition the chain 15ᵃ of the endless conveyor 11. The weights 38ᵃ for urging downwards the take-up sprocket wheel 22ᵃ are slidable vertically between the laterally spaced channel beams 29ᵃ and are mounted on the rod 36ᵃ which extends upwards from the bearing block 28ᵃ. The weights for urging downwards the take-up sprocket wheel 23ᵃ are vertically slidable between the laterally spaced channel beams 33ᵃ and are mounted on the rod 37ᵃ which depends from the bearing block 32ᵃ. The weights for urging downwards the take-up sprocket wheel 24ᵃ are vertically slidable between the channel beams 35ᵃ and are mounted on the rod 37ᵃ which depends from the bearing block 34ᵃ.

The power mechanism 12 operates to drive the endless conveyor 11 as shown by arrows in Figure 1. It is subject to the action of the automatic control means 13 and consists of an electric motor 39 and gearing between the motor and the drive sprocket wheels in the upper portion of the smoke chamber 10. The electric motor 39 is disposed exteriorly of the smoke chamber and is supported by way of a framework 40 on one of the walls b of the building B. The gearing of the power mechanism 12 comprises a horizontally extending drive shaft 41 and a pair of parallel laterally spaced driven shafts 42 and 42ᵃ. The shaft 41, like the motor 39, is disposed exteriorly of the smoke chamber. It extends in parallel relation with the notched crossbars 16 of the endless conveyor 11 and is driven from the armature shaft of the electric motor 39 by way of a belt and pulley connection 43. The driven shaft 42 extends at right angles to the drive shaft 41 and projects into the smoke chamber 10. It is located beneath and to one side of the horizontally extending channel beam 26 and is driven from the drive shaft 41 by way of a worm gear type speed reducing unit 44 (see Figures 2 and 3). Worm and worm gear type speed reducing units 45 are disposed between the drive shaft 42 and the stub axles for the drive sprocket wheels 17, 18 and 19. The driven shaft 42ᵃ projects into the smoke chamber 10 and is disposed beneath and to one side of the beam 26ᵃ. It is disposed in the same horizontal plane as the shaft 42 and is connected by way of a worm gear type speed reducing unit 44ᵃ for drive by the drive shaft 41. Worm and worm gear type speed reducing units 45ᵃ serve to connect the stub axles of the drive sprocket wheels 17ᵃ, 18ᵃ and 19ᵃ for drive from the driven shaft 42ᵃ. The units 44 and 44ᵃ are the same in size and the units 45 and 45ᵃ are likewise the same in size with the result that when the current is supplied to the electric motor 39 the drive sprocket wheels are all driven at the same speed and operate slowly and continuously to drive the endless conveyor 11. Current is supplied to the electric motor 39 by way of a pair of line conductors 46 and 46ᵃ. The conductor 46 is provided with a main manually manipulable control switch 47. Under normal operating conditions when this switch is closed current is supplied to the electric motor 39 and the latter operates through the medium of the gearing between it and the drive sprocket wheels to drive the endless conveyor 11.

The control means 13 serves and operates, as hereinafter described, automatically to stop the electric motor 39 of the power mechanism 12 in the event that the take-up sprocket wheels are displaced vertically as a result of the chains running off of them or breaking or any of the food products being smoked dropping between them and the chains. It comprises a pair of switches 48 and 48ᵃ in the conductor 46 and a pair of slide bars 49 and 49ᵃ. The switch 48 and the slide bar 49 are associated with the chain 15 of the endless conveyor and coact to open the motor circuit, that is, break the conductor 46 in the event of vertical displacement of any of the take-up sprocket wheels 22, 23 and 24. The switch 48ᵃ and the slide bar 49ᵃ are associated with the other chain, that is, the chain 15ᵃ of the conveyor and coact automatically to break the motor circuit in the event of vertical displacement or sliding movement of any one of the take-up sprocket wheels for the chain 15ᵃ. The switch 48 is exteriorly disposed with respect to the smoke chamber 10 and is located above, and outwardly of one end of, the horizontally extending channel beam 31. It is disposed in a cover-equipped housing 50 on one of the walls b of the building B and is provided with a control lever 51. The latter normally extends vertically, as shown in Figure 9, and is adapted when it is in its normal position to maintain the switch 48 in its closed position. The lower end of the control lever 51 is fixed to a rock shaft 52 and the upper end of the lever is provided with a roller 53. The rock shaft permits the lever 51 to be swung laterally out of its normal position and is so arranged with respect to the switch 48 that when the lever is swung laterally out of its normal position opening of the switch 48 is effected. The lever is releasably held in its normal position by way of a vertically movable plate 54. The latter has a central recess 55 for accommodating the roller 53 and is urged downwards by way of compression springs 56. When the lever 51 is in its normal position the roller 53 fits within the recess 55, as shown in Figure 9, and the plate thus holds the lever in place. When horizontal force is exerted against the lever the roller 53 snaps out of the recess 55 and the lever 51 swings laterally, as shown by dotted lines in Figure 9, into a position wherein the switch 48 is in its open position. The slide bar 49 extends parallel to, and overlies, the horizontally extending channel beam 31. It is carried for horizontal sliding movement by way of pairs of brackets 57. The latter are secured to, and project outwardly from plates 58 which are welded or otherwise fixedly secured to the top flange of the beam 31. The end of the slide bar which is adjacent the switch 48 is provided with a longitudinally adjustable extension 59. The latter projects into the housing 50 for the switch 48 and is aligned with the roller 53 at the upper end of the control lever 51. When the slide bar 49 is shifted or moved forwards, that is, in the direction of the switch 48 the extension 59 engages the roller 53 and shifts the lever 51 into its switch opening position. The slide rod 49 is automatically shifted into its switch opening position in response to either upward or downward displacement of the take-up sprocket wheels 22, 23 and 24, by means of lower cam type cones 60, inverted cam type cones 61 and pins 62. The lower cones 60 have internally threaded bores and are mounted on the upper externally threaded ends of the rods 36 at a point beneath the slide bar 49. Lock nuts 63 are applied to the lower cones 60 and serve to lock the latter in place. The upper cones 61 are disposed above the lower cones and have internally threaded bores. They are mounted on the upper extremities of the rods 36 and are locked in place by means of lock nuts 64. The pins 62 project at right angles to the slide bar 49 and are clamped to the latter by brackets 65 in such manner that they may be adjusted lengthwise of the slide rod. When the slide rod is in its retracted position the pins 62 engage the rods 36 midway between the cones 60 and 61. In the event that the take-up sprocket wheels 22, 23 and 24 move upwards for any reason whatsoever the lower cam type cones 60 strike against the pins 62 in such manner that the pins together with the slide bar 49 move in the direction of the switch 48. During forward sliding movement of the bar 49 automatic opening of the switch 48 is effected, as hereinbefore pointed out. Should the take-up sprocket wheels 22, 23 and 24 for the chain 15 move downwards for any reason whatsoever the upper inverted cam type cones 61 move downwards into engagement with the pins 62 and so cam the pins as to effect forward shift or sliding of the bar 49 and resultant opening of the switch 48. Forward shifting of the slide bar 49 takes place in the event that one or all of the sprocket wheels 22, 23 and 24 are vertically displaced. Due to the fact that the cones 60 and 61 have internally threaded bars they may be adjusted vertically on the upper ends of the rods 36 in order properly to position them with respect to the pins 62. Should there be any increase in the length of the chain due to wear with resultant displacement of the cones with respect to the pins 62 the cones may be adjusted into proper position by releasing the lock nuts 63 and 64 and turning the cones until they are in proper straddling relation with the pins. The cones 60 and 61, the pins 62, and the slide bar 49 constitute simple means for automatically opening the switch 48 in the event of pronounced vertical displacement of the take-up sprocket wheels 22, 23 and 24 in either direction. The upper ends of the rods 36 extend through bushings 66 on the central portions of the plates 58. Downward displacement of the take-up sprocket wheels 22, 23 and 24 is limited or restricted by way of the lock nuts 63 for the lower cones 60. Should the chain 15 break the sprocket wheels move downwards until the lock nuts 63 strike against the upper ends of the bushings 66. During such movement of the sprocket wheels 22, 23 and 24 the upper cones 61 effect forward shift of the slide bar 49 and opening of the switch 48, as hereinbefore pointed out. The switch 48ᵃ is the same in design and construction as the switch 48. It is mounted on the same wall b as the switch 48 and is disposed slightly above and outwards of one end of the beam 31ᵃ. A cover-equipped housing 50ᵃ surrounds the switch 48ᵃ. The latter embodies a control lever 51ᵃ and is adapted automatically to be shifted into its open position for motor stopping purposes in response to forward movement of the slide bar 49ᵃ. The latter is carried for horizontal sliding movement by pairs of brackets 57ᵃ which are connected to, and extend upwardly from, plates 58ᵃ on the upper flange of the beam 31ᵃ. Lower cam type cones 60ᵃ and upper inverted cam type cones 61ᵃ on the upper ends of the rods 37ᵃ together with laterally extending pins 62ᵃ on the slide bar 49ᵃ serve automatically to shift the bar into its switch opening position in response to vertical displacement of any or all of the take-up sprocket wheels 22ᵃ, 23ᵃ and 24ᵃ. The cones 60ᵃ and 61ᵃ are vertically adjustable on the upper ends of the rods 36ᵃ in the same manner as the cones 60 and 61 are vertically adjustable on the upper ends of the rods 36 and are locked in place by means of lock nuts 63ᵃ and 64ᵃ. The pins 62ᵃ are adjustably clamped to the slide bar 49ᵃ by way of brackets 65ᵃ. The cones 60ᵃ and 61ᵃ, the pins 62ᵃ and the slide bar 49ᵃ constitute simple means for automatically effecting opening of the switch 48ᵃ in the event that there is vertical displacement of any or all of the take-up sprocket wheels 22ᵃ, 23ᵃ and 24ᵃ. The switches 48 and 48ᵃ are normally in their closed position and are adapted in the event of opening, due to forward sliding movement of the slide bars 49 and 49ᵃ as a result of vertical displacement of any of the take-up sprocket wheels, to be manually reset or closed.

When it is desired to use or operate the smokehouse a smoke producing fire is built in the compartment 14. Thereafter the main switch 47 in the conductor 46 is closed. This results in the supply of current to the electric motor 39 and resultant slow and continuous drive of the chains 15 and 15ᵃ of the endless conveyor 11. During drive of the conveyor the meat products to be conditioned or smoked are hung on the crossbars 16 as the latter pass the doorway b³. The products while suspended from the crossbars and during drive of the conveyor move slowly up and down in the smoke chamber 10 and are subjected to conditioning and smoking as a result of contact with the smoke which is produced by the fire in the compartment 14. In the event that one of the food products should fall and become lodged between the chain 15 and the take-up sprocket wheel 23, as shown in Figure 6, such sprocket wheel is caused to move upwards. During upward movement of the sprocket wheel 23 the lower cone 60 which is associated therewith strikes against the adjacent pin 62 on the slide bar 49 and urges the bar outwards to such an extent as to effect opening of the switch 48. As soon as this switch is opened the supply of current to the motor 39 is cut off and immediate stoppage of the endless conveyor is effected. Should any of the other take-up sprocket wheels move upwards for any reason whatsoever drive of the conveyor automatically ceases, as hereinbefore pointed out. Should the portion of the chain 15 which surrounds the take-up sprocket wheel 22 break, as shown in Figure 6, such sprocket wheel slides downwards and automatic opening of the switch 48 is effected due to the action of the upper cone 61 which is associated with the sprocket wheel 22. Likewise should any of the other take-up sprocket wheels move downwards due to breakage of the chain reaches which are associated therewith, or the chains running off of them immediate and automatic stoppage of the conveyor is effected. Should any of the hereinbefore-mentioned contingencies arise the smokehouse after servicing or repair of the operating parts thereof is put back into its operating position by manually retracting the slide bars 49 and 49ᵃ and resetting the switches 48 and 48ᵃ. After the meat products have been processed or conditioned within the smoke chamber 10 they are removed from the crossbars of the endless conveyor. Should either of the chains break or in the event either of the chains should run off any of the sprocket wheels therefor the control mechanism will, as hereinbefore pointed out, automatically render the power mechanism 12 inoperative.

Figures 10 and 11 of the drawings illustrate or disclose a different or modified form of switch controlling mechanism. Such mechanism comprises a switch 148 corresponding to the switch 48. It also comprises a horizontally extending switch actuating bar 149. The latter is like the bar 49 except that it is supported by upstanding U-shaped pivot links 157. The lower ends of the pivot links are pivotally connected to brackets 157ᵃ on the subjacent beam or supporting element, and the upper ends of the links are provided with transversely extending pivot bolts 162. These bolts extend through holes in the bar 149 and support rollers 162ᵃ. The latter normally rest upon the rods which are associated with, and project upwardly from, the take-up sprocket wheels and are positioned between the cam shaped cones on such rods. The links carry the bar 149 so that it is shiftable horizontally. When the rollers are engaged by the cones due to vertical displacement of the take-up sprockets the bar 149 is shifted in the direction of the switch 148 and operates to open the latter. The switch 148 and the bar 149 are associated with one of the chains of the conveyor and a like switch and bar are associated with the other conveyor chain.

It is to be understood that the invention is not to be restricted to the details set forth since these may be modified within the scope of the appended claims without departing from the spirit and scope of the invention.

Having thus described the invention what I claim as new and desire to secure by Letters Patent is:

1. In a smokehouse of the character described, the combination of means forming a smoke chamber, means associated with the chamber for producing smoke therein, a conveyor disposed in said chamber and embodying a drive sprocket wheel, a bodily movable take-up sprocket wheel and an endless chain trained around the two sprocket wheels and having means for supporting the products to be smoked, power mechanism connected to the drive sprocket wheel and adapted to drive the conveyor, and means for automatically rendering the power mechanism inoperative in the event of pronounced movement of the take-up sprocket wheel.

2. In a smokehouse of the character described, the combination of means forming a smoke chamber, means associated with the chamber for producing smoke therein, a conveyor disposed in said chamber and embodying drive sprocket wheels at the top of the chamber, vertically movable sprocket wheels at the bottom of the chamber and an endless chain trained around the drive and take-up sprocket wheels in such manner that it has vertical reaches and having means for carrying the products to be smoked, power mechanism connected to the drive sprocket wheels and adapted to drive the conveyor, and means for automatically rendering the power mechanism inoperative in the event of material vertical displacement of any of the take-up sprocket wheels.

3. In a smokehouse of the character described, the combination of means forming a smoke chamber, means associated with the chamber for producing smoke therein, a conveyor disposed in said chamber and embodying drive sprocket wheels at the top of the chamber, vertically movable take-up sprocket wheels at the bottom of said chamber and an endless chain trained around the drive and take-up sprocket wheels in such manner that it has vertical reaches and having means for carrying the products to be smoked, power mechanism for driving the conveyor including an electric motor with a switch equipped circuit therefor, and means for automatically opening the switch in the event of material vertical displacement of any one of the take-up sprocket wheels.

4. A smokehouse comprising in combination, means forming a vertically elongated smoke chamber with a fire compartment at the bottom thereof, a conveyor disposed in such chamber above the compartment and consisting of two opposed laterally spaced sets of sprocket wheels in the form of drive sprocket wheels at the top and vertically movable take-up sprocket wheels at the bottom, a pair of endless chains trained around the sets of sprocket wheels respectively so that they have a plurality of vertically extending reaches, and a series of crossbars between the chains for supporting the products to be smoked, power mechanism connected to the drive sprocket wheels and adapted to drive the conveyor, and means for automatically rendering the power mechanism inoperative in the event of material vertical displacement of any one of the take-up sprocket wheels.

5. A smokehouse comprising in combination, means forming a smoke chamber, means associated with the chamber for producing smoke therein, a conveyor disposed in said chamber and consisting of two opposed laterally spaced sets of sprocket wheels in the form of drive sprocket wheels at the top and vertically movable take-up sprocket wheels at the bottom, a pair of endless chains trained around the sets of sprocket wheels respectively so that they have a plurality of vertically extending reaches, and a series of crossbars between the chains for supporting the products to be smoked, power mechanism for driving the conveyor comprising an electric motor disposed exteriorly of the smoke compartment and having a circuit therefor with switch means and speed reducing gearing between the motor and the drive sprocket wheels, and means positioned for the most part in the chamber for automatically controlling the switch means so as to break the circuit when any of the take-up sprocket wheels is displaced vertically to any material extent.

6. In combination with a smokehouse embodying means forming a smoke chamber, means associated with the chamber for producing smoke therein, a conveyor disposed in said chamber and embodying a drive sprocket wheel at the top, a vertically movable take-up sprocket wheel at the bottom and an endless chain trained around the two sprocket wheels and having means for carrying the products to be smoked, and power mechanism for driving the conveyor including an electric motor with a switch equipped circuit therefor, means for automatically opening the switch in the event of vertical displacement of the take-up sprocket wheel comprising a movably mounted element arranged to open the switch when moved in one direction and a coacting element associated and bodily movable with the take-up sprocket wheel and arranged to shift the element in said one direction in response to vertical movement of said take-up sprocket wheel.

7. In combination with a smokehouse embodying means forming a smoke chamber, means associated with the chamber for producing smoke therein, a conveyor disposed in said chamber and embodying a drive sprocket wheel at the top, a vertically movable take-up sprocket wheel at the bottom, and an endless chain trained around the two sprocket wheels and having means for carrying the products to be smoked, and power mechanism for driving the conveyor including an electric motor with a switch equipped circuit therefor, means for automatically rendering the power mechanism inoperative in the event of vertical displacement of the take-up sprocket wheel comprising a movably mounted element arranged to open the switch when shifted in one direction and a coacting cam type element associated and bodily movable with the take-up sprocket wheel and arranged to move the first mentioned element in said one direction in response to vertical movement or displacement of said take-up sprocket wheel.

8. In combination with a smokehouse embodying means forming a smoke chamber, means associated with the chamber for producing smoke therein, a conveyor disposed in said chamber and embodying a drive sprocket wheel at the top, a vertically movable take-up sprocket wheel at the bottom, and an endless chain trained around the two sprocket wheels and having means for carrying the products to be smoked, and power mechanism for driving the conveyor including an electric motor with a switch equipped circuit therefor, means for automatically rendering the power mechanism inoperative in the event of vertical displacement of the take-up sprocket wheel comprising a movably mounted bar provided with a laterally extending member and adapted when moved in one direction to open the switch, and a pair of opposed vertically spaced cam type elements associated and movable vertically with the take-up sprocket wheel and arranged in straddled relation with the member and so that one engages the member and moves the bar in said one direction in response to downward displacement of the take-up sprocket wheel and the other engages the member and moves the bar in said one direction in response to upward displacement of said take-up sprocket wheel.

9. In combination with a smokehouse embodying means forming a smoke chamber, means associated with the chamber for producing smoke therein, a conveyor disposed in said chamber comprising a top drive sprocket wheel, a vertically movable bottom take-up sprocket wheel with a vertically extending rod associated and movable therewith, and an endless chain trained around the two sprocket wheels and having means for carrying the products to be smoked, and power mechanism for driving the conveyor including an electric motor with a switch equipped circuit therefor and speed reducing gearing between the motor and the drive sprocket wheel, means for automatically rendering the drive means inoperative in the event of vertical displacement of the take-up sprocket wheel comprising a movably mounted bar provided with a laterally extending member adjacent said rod and adapted when shifted in one direction to open the switch, and a pair of opposed cam type cones mounted one above the other and adjustably on the rod and arranged so that when the take-up sprocket wheel moves down one engages the member and shifts the bar in said one direction and when the take-up sprocket wheel moves upwards the other engages the member and shifts the bar in said one direction.

10. In combination with a smokehouse embodying means forming a smoke chamber, means associated with the chamber for producing smoke therein, a conveyor disposed in said chamber and comprising two sets of opposed laterally spaced sprocket wheels in the form of drive sprocket wheels and vertically movable take-up sprocket wheels, and a pair of endless chains trained around the two sets of sprocket wheels respectively and having a series of crossbars therebetween for supporting the products to be smoked, and power means for driving the conveyor consisting of an electric motor having a circuit therefor with a pair of normally closed switches therein and a speed reducing gearing between the motor and the drive sprocket wheels, of means for automatically opening one of the switches in the event of vertical displacement of any one of the take-up sprocket wheels of one of the sets, and means for automatically opening the other switch in the event of displacement of any one of the take-up sprocket wheels of the other set.

NORMAN J. ALLBRIGHT.